United States Patent [19]

Sonohara et al.

[11] Patent Number: 5,640,421
[45] Date of Patent: Jun. 17, 1997

[54] MODIFIED DISCRETE COSINE TRANSFORM SIGNAL TRANSFORMING SYSTEM

[75] Inventors: Mito Sonohara; Kyoya Tsutsui, both of Kanagawa, Japan

[73] Assignee: Sony Corporation, Tokyo, Japan

[21] Appl. No.: 731,698

[22] Filed: Oct. 17, 1996

Related U.S. Application Data

[63] Continuation of Ser. No. 459,294, Jun. 2, 1995, abandoned, which is a continuation of Ser. No. 119,003, Sep. 9, 1993, abandoned.

[30] Foreign Application Priority Data

Sep. 28, 1992 [JP] Japan ................................. 4-282440

[51] Int. Cl.$^6$ .......................................... A04B 14/00
[52] U.S. Cl. .................................... 375/240; 364/725
[58] Field of Search ............................. 375/240, 241, 375/243, 245; 381/29; 348/400, 403, 408; 364/725–726

[56] References Cited

U.S. PATENT DOCUMENTS

| | | | |
|---|---|---|---|
| 5,218,561 | 6/1993 | Iwadare | 364/725 |
| 5,311,549 | 5/1994 | Mahieux | 375/342 |
| 5,349,549 | 9/1994 | Tsutsui | 364/725 |

FOREIGN PATENT DOCUMENTS

| | | | |
|---|---|---|---|
| 0 402 145 A3 | 12/1990 | European Pat. Off. | G06F 15/332 |
| 0 463 473 A2 | 1/1992 | European Pat. Off. | G06F 15/332 |
| 0 535 893 A2 | 4/1993 | European Pat. Off. | G06F 15/332 |
| 4-44299 | 2/1992 | Japan . | |

OTHER PUBLICATIONS

"Adaptive Transform Encoding With Adaptive Block Lengths Using MDCT," by Uzu, Sugiyama, Iwatare and Nishiya in Extended Abstracts in Spring Meeting of Japan Society of Electronic Information Communication 1990, A–197.

Research "On A Modified Discrete Cosine Transorm (MDCT) And Its Fast Algorithm," by Iwatare, Nishiya and Sugiyama, C&C Systems Research Laboratories, NEC Corporation, CAS 90–9, DSP 90–13, pp. 49–54.

"Fast Fourier Transform," by E. Oran Bringham, translated by Miyagawa and Imai, pp. 196–198.

"Constraint Conditions For Multiple–Blocksize Modified––DCT," by Mochizuki, Yano and Nishitani in Shingaku-ghio, CAS 90–10, DSP90–14, pp. 55–60.

*Primary Examiner*—Young T. Tse
*Attorney, Agent, or Firm*—Limbach & Limbach L.L.P.

[57] ABSTRACT

An MDCT calculating circuit includes an $x_{01}$ calculating circuit for multiplying input signals with a forward transforming window and a linear forward transforming unit for linear forward transforming an output signal of the calculating circuit. The linear forward transforming unit includes an $x_{02}$ calculating circuit and an $x_{03}$ calculating circuit for pre-processing the output signal of the $x_{01}$ calculating circuit and an integration and summation processing circuit for executing integration and summation processing operations on an output signal of the pre-processing unit. The integration and summation processing circuit executes an integration and summation operation on an N/2 number of input signals from the pre-processing unit by grouping a k number of input signals as a processing unit and iteratively executes the integration and summation processing operations a N/(2*K) number of times for outputting a sum total of N/2 number of signals.

14 Claims, 7 Drawing Sheets

MODIFIED DISCRETE COSINE TRANSFORM SIGNAL TRANSFORMING SYSTEM

This is a continuation of application Ser. No. 08/459,294 filed on Jun. 2, 1995 which is a continuation of application Ser. No. 08/119,003 filed Sep. 9, 1993, now, both are abandoned.

BACKGROUND OF THE INVENTION

1. Field of the Invention

This invention relates to a modified discrete cosine transform (MDCT) signal transforming device for executing fast calculation of linear transformation on digital signals such as speech, audio or picture signals.

2. Description of the Related Art

There has hitherto been known a transform encoding employing a so-called orthogonal transform as a type of high efficiency encoding of encoded chronological sampling data such as audio signals encoded by high-efficiency bit compression. The transform encoding means encoding after block-based orthogonal transform of input signals. Typical of the transform encoding is a discrete cosine transform (DCT). Such transform encoding suffers from a problem of block distortion in which non-continuous block-to-block transitions are perceived as noises. The conventional practice for coping with such problem has been to have an end of a block overlapped with an adjacent block. According to a modified DCT (MDCT), a given block is overlapped with both adjacent blocks each by one-half a block size in such a manner as to preclude superfluous transmission of samples of overlapped portions. Thus the MDCT is highly suitable for high efficiency encoding.

Such MDCT and IMDCT inverse modified discrete cosine transform, which is its inverse transformation, are disclosed in "Filter Constraints in Hybrid MDCT Containing Plural Block Sizes" by Mochizuki, Yano and Nishiya in SHINGAKU-GIHO, CAS 90-10, DSP90-14, pages 55 to 60 and in "Adaptive Transform Encoding with Adaptive Block Lengths Using MDCT" by Uzu, Sugiyama, Iwatare and Nishiya in Extended Abstracts in Spring Meeting of Japan Society of Electronic Information Communication 1990, A-197. The above-mentioned MDCT and IMDCT are explained briefly by referring to FIG. 1.

Referring to FIG. 1, a given block of chronological sampling data, such as Jth block, has an overlap with the (J−1)th block and the (J+1)th block each by a half block (50% overlap). If the number of samples of the Jth block is N, N being a natural number, there is an overlap of N/2 samples between the Jth block and the (J−1)th block, while there is similarly an overlap of N/2 samples between the Jth block and the (J+1)th block. Each of N samples of each of these blocks, such as the above-mentioned Jth block, is multiplied by a window Wh for forward transform or a pre-processing filter to produce an N number of chronological data 102.

The characteristics of the pre-processing filter or window Wh for orthogonal transform are selected depending on statistic properties of input signals so that power concentration of the transformed data will be maximum. By processing these N samples of the chronological data 102 by linear forward transformation by MDCT, an N/2 number of independent spectral data 103, that is one-half the number of input samples of the spectral data, are produced on the frequency domain. These N/2 number of the spectral data 103 are processed by inverse MDCT for producing an N number of chronological data 104 which are multiplied by a window Wf for executing inverse transform or a synthetic filter to produce chronological data 105. The resulting data are summed to output results of the forward and backward blocks to restore the original chronological input data.

Meanwhile, in practical processing operation of MDCT and IMDCT, a method for implementing fast operation using fast Fourier transform has been proposed in "A research in MDCT System and Fast Operation" by Iwatare, Nishiya and Sugiyama, in SHNGAK-GIHO, CAS 90-9, DSP 90-13, pages 49 to 54. The same method has also been disclosed in JP Patent KOKAI Publication No.4-44099 (1992). The calculating method for MDCT and IMDCT disclosed therein is hereinafter explained.

The definition of MDCT is given by an equation (1).

$$y_0(k) = C_0 \sum_{n=0}^{N-1} x_0(n)h(n)\cos(\pi(2k+1)(2n+N/2+1)/(2N)) \quad (1)$$

$$0 \leq k \leq N/2 - 1$$

In the above equation (1), $x_0$ is an MDCT input signal, N a block length, Wh a window function for forward transform, $y_0$ an MDCT output signal, $C_0$ a constant, n an integer of from 0 to N−1, and k an integer of from 0 to N/2−1. Since MDCT processing on sliced chronological data is executed independently for each of the blocks, the block number J is omitted. Meanwhile, since the value of $C_0$ is not critical in carrying out the calculation of MDCT, the following explanation is made on the assumption that $C_0=1$. For carrying out the operation, $x_0$ is multiplied by a window for forward transform to find $x_{01}$ as indicated by the equation (2).

$$x_{01}(n) = x_0(n)h(n) \quad 0 \leq n \leq N-1 \quad (2)$$

From $x_{01}$, as found from equation (2), $x_{02}$ is calculated in accordance with equation (3).

$$x_{02}(n) = \begin{cases} -x_{01}(n+3N/4) & 0 \leq n \leq N/4 - 1 \\ x_{01}(n-N/4) & N/4 \leq n \leq N-1 \end{cases} \quad (3)$$

$x_{03}$ is calculated in accordance with equation (4).

$$x_{03}(n) = x_{02}(2n) - x_{02}(N-1-2n) \quad 0 \leq n \leq N/2 - 1 \quad (4)$$

Then, $x_{03}$ is multiplied by a coefficient as shown by the equation (5) to produce a series of complex number signals $z_{01}$.

$$z_{01}(n) = x_{03}(2n)\exp(-j2\pi n/N) \quad 0 \leq n \leq N/2 - 1 \quad (5)$$

This signal series is processed with FFT having a length of N/2 to produce a series of complex number signals $z_{02}$ shown by the equation (6).

$$z_{02}(k) = \sum_{n=0}^{N/2-1} z_{01}(n)\exp(-j2\pi kn/(N/2)) \quad (6)$$

$$0 \leq k \leq N/2 - 1$$

$y_{01}$ is calculated from the produced series of complex number signals, as indicated by the following equation (7).

$$y_{01}(k) = Re(z_{02}(k)\exp(-j2\pi(k+1/2)/(2N))) \quad (7)$$
$$0 \leq k \leq N/2 - 1$$

The above is coincident with $y_0$ defined by the equation (1), as demonstrated by the above-cited Research Concerning MDCT System and Fast calculation.

On the other hand, definition of IMDCT is given by an equation (8).

$$x_1(n) = C_1 f(n) \sum_{k=0}^{N/2-1} y_1(k)\cos(\pi(2k+1)(2n+N/2+1)/(2N)) \quad (8)$$

$$0 \leq n \leq N-1$$

In the above equation (8), $y_1$ is an IMDCT input signal, N a block length, f a window function for inverse transformation, $x_1$ is an IMDCT output signal, $C_1$ is a constant, n an integer of from 0 to N−1 and k an integer of from 0 to N/2−1. Since IMDCT processing on sliced chronological data is executed independently for each of the blocks, the block number J is omitted. Meanwhile, since the value of $C_0$ is not critical in carrying out the calculation of MDCT, the following explanation is made on the assumption that $C_0$=1. For carrying out the calculation, $y_1$ is re-arrayed in accordance with the following equation (9) to produce $y_{11}$:

$$y_{11}(k) = \begin{cases} y_1(2k) & 0 \leq k \leq N/4 - 1 \\ -y_1(N-1-2k) & N/4 \leq k \leq N/2 - 1 \end{cases} \quad (9)$$

$y_{11}$ is then multiplied by a coefficient as shown by the equation (10) to produce a series of complex number signals $z_{11}$:

$$z_{11}(k) = y_{11}(k)\exp(-j2\pi k/N) \quad 0 \leq k \leq N/2 - 1 \quad (10)$$

The complex number signal series is processed by inverse FFT over a length N/2 to produce a series of complex number signals $z_{12}$ by the equation (11):

$$z_{12}(n) = \sum_{n=0}^{N/2-1} z_{11}(k)\exp(j2\pi nk/(N/2)) \quad (11)$$

$$0 \leq n \leq N/2 - 1$$

The complex number signal series $z_{12}$ thus formed is multiplied by a coefficient as shown by the equation (12) and a real number part is taken out to produce $x_{11}$:

$$x_{11}(n) = Re(2z_{12}(n)\exp(-j2\pi(n+1/2)/(2N))) \quad (12)$$
$$0 \leq n \leq N/2 - 1$$

This $x_{11}$ is re-arrayed, while changing its sign, as indicated by the equation (13), and is multiplied by inverse transforming window.

$$x_{12}(n) = \begin{cases} f(n)x_{11}(n+N/4) & 0 \leq n \leq N/4 - 1 \\ -f(n)x_{11}(3N/4-1-n) & N/4 \leq n \leq 3N/4 - 1 \\ -f(n)x_{11}(n-3N/4) & 3N/4 \leq n \leq N/2 - 1 \end{cases} \quad (13)$$

The above is coincident with $y_0$ defined by the equation (8), as demonstrated by the above-cited Research Concerning MDCT System and Fast calculation.

However, since the fast processing of MDCT for finding the spectrum for each domain having a length N and IMDCT which is its inverse operation are carried out with the present method using a complex number FFT having a length N/2, the N/4 log(N/2) times of multiplication of complex numbers, the N/4 log(N/2) times of addition of complex numbers and a work area for storing N/2 number of complex numbers are required if the algorithm as described above all in pp. 196 to 198 of "Fast Fourier Transform", by E. ORAN BRINGHAM, translated by Miyagawa and Imai, Theory of Base 2 FFT Algorithm, is used, meaning that the method cannot be said to be sufficiently effective if it is attempted to carry out fast processing by a small-scale processing unit.

OBJECTS AND SUMMARY OF THE INVENTION

In view of the above-depicted status of the art, it is an object of the present invention to provide a signal processing method by modified DCT in which the operation of the modified DCT and IMDCT, its inverse transform, may be realized by integration and summation based on a K number of terms as a processing unit with the use of a small-sized processing unit.

According to the present invention, there is provided a modified DCT signal transforming device for processing an N number of sample input signals, comprising a forward transforming window unit for multiplying input signals with a forward transforming window and a linear forward transforming unit for linear forward transforming output signals of said forward transforming window unit, characterized in that the linear forward transforming unit comprises a pre-processing section for pre-processing the output signals of the forward transforming window unit and an integration and summation processing section for executing integrating and summation processing operations on output signals of the pre-processing section, the integration and summation processing section executing integration and summation processing operations on an N/2 number of input signals supplied from the pre-preprocessing section, the N/2 number of the input signals being previously grouped into sets each consisting of a K number of terms, said integration and summation operations being iteratively executed an N/(2*K) number of times for outputting a sum total of N/2 number of signals.

It is noted that K in the convolution unit is a power of 2 and is not less than 4.

The pre-preprocessing unit outputs, with an N number of samples of input signals of from 0 to (N−1), obtained on multiplying the forward transforming windows in the forward transforming window section, the n+3N/4th input signal inverted in sign as the nth intermediate signal for n of from 0 to N/4−1, and an n−N/4th input signal as the nth intermediate signal for n of from N/4 to N−1. With an N number of samples of intermediate signals of from 0 to (N−1), the preprocessing unit outputs the 2n-th intermediate signal less the N−1−2n-th intermediate signal as an nth output signal.

The integration and summation processing unit decreases the number of times of the processing operations by grouping an N/2 number of input signals supplied from the pre-processing unit into sets each consisting of a K number of terms, based on periodicity, for outputting the N/2 number of the signals.

The integration and summation processing unit performs, on an N/2 number of input signals supplied from the pre-processing unit, a series of processing operations for m of from 0 to N/(2K)−1 until the number of output signals becomes equal to N/2. The series of the processing operations consists in providing, as, a jth first intermediate signal, a sum for l of from 0 to N/2−1 of a product of the (Kl+j)th input signal multiplied by $\cos(\pi(2m+1)(4K+1)/(2N))^{-}$, for j of from 0 to K−1, providing, as a jth first intermediate signal, a sum for l of from 0 to N/2−1 of a product of the (K(l−1)+j)th input signal multiplied by $\sin(\pi(2m+1)(4Kl+1)/(2N))^{-}$ for j of from K to (2K−1), providing, as a jth second intermediate signal, a sum of the jth first intermediate signal multiplied by $-\cos(2\pi(2m+1)(j/N))^{-}$ and the (j−K)th first intermediate signal multiplied by $-\sin(2\pi(2m+1)(j/N))^{-}$ for j of from K to K−1, providing, as a jth second intermediate signal, a sum of the (j−K)th first intermediate signal multiplied by $-\sin(2\pi(2m+1)(j-K)/N)$ and the jth first intermediate signal multiplied by $-\cos(2\pi(2m+1)(j-K)/N)$, for j of from K to 2K−1, providing, as a k-th third intermediate signal, a sum of the jth second intermediate signal multiplied by $\cos(2\pi Jk(4j+1)/(4K))$, for j of from 0 to K−1, providing, as the k-th third intermediate signal, a sum of the jth second intermediate signal multiplied by $\sin(2\pi k(4(j-K)+1)/(4K))$, for k of from K to (2K−1), and providing, as a (m+kN/(2K))th output signal, a sum of the k-th third intermediate signal and a (m+kN/(2K))th third intermediate signal, for k of from 0 to K−1.

The integration and summation processing unit performs a processing operation of computing an output signal of the integration and summation processing unit from the second intermediate signal by a processing volume reduced by one half by grouping the second intermediate signals by each two terms by taking advantage of periodicity so that the number of output signals becomes equal to N/2.

The integration and summation processing unit performs a processing operation of computing an output signal of the integration and summation processing unit from the second intermediate signal by a processing volume reduced by one quarter by grouping the second intermediate signals each by four terms by taking advantage of periodicity so that the number of output signals becomes equal to N/2.

A modified DCT signal processing device for processing an N/2 number of independent input signals, comprising a linear inverse transforming unit for linear inverse transform of input signals, and an inverse transforming window unit for multiplying an output signal of the linear inverse transform unit by an inverse transforming window, wherein the linear inverse transforming unit comprises a pre-processing unit for pre-processing an input signal, an integration and summation processing unit for executing an integration and summation processing operations on an output signal of said pre-processing unit, and a post-processing unit for post-processing an output signal of the integration and summation processing unit, the integration and summation processing unit executing the integration and summation operations on the N/2 number of input signals supplied from the pre-processing unit by grouping the input signal by a K number of terms, and executing the operations iteratively by N/(2*K) number of times for outputting a sum total of an N/2 number of signals.

In the integration and summation processing section, K is a power of 2 which is not less than 4.

The pre-processing unit outputs a signal equivalent to a k-th output signal which is the 2k-th input signal for values of k of from 0 to N/4−1 and a signal equivalent to a k-th output signal which is the (N−1−2k)th input signal inverted in sign for values of k of from N/4 to N/2−1.

The integration and summation processing unit decreases the number of times of processing operations for integration and summation processing of N/2 number of input signals supplied from the pre-processing unit based on periodicity for outputting said N/2 number of signals.

The integration and summation processing unit performs, on an N/2 number of input signals supplied from the pre-processing unit, a series of processing operations for m of from 0 to N/(2K)−1 until the number of output signals becomes equal to N/2. The series of the processing operations consists in providing, as a jth first intermediate signal, a sum for l of from 0 to N/2−1 of a product of the (Kl+j)th input signal multiplied by $\cos(\pi(2m+1)(4K+1)/(2N))$, for j of from 0 to K−1, providing, as a jth first intermediate signal, a sum for l of from 0 to N/2−1 of a product of the (K(l−1)+j)th input signal multiplied by $\sin(\pi(2m+1)(4Kl+1)/(2N))$ for j of from K to (2K−1), providing, as a jth second intermediate signal, a sum of the jth first intermediate signal multiplied by $-\cos(2\pi(2m+1)(j/N))$ and the (j−K)th first intermediate signal multiplied by $-\sin(2\pi(2m+1)(j/N))$, for j of from K to K−1, providing, as a jth second intermediate signal, a sum of the (j−K)th first intermediate signal multiplied by $-\sin(2\pi(2m+1)(j-K)/N)$ and the jth first intermediate signal multiplied by $-\cos(2\pi(2m+1)(j-K)/N)$, for j of from K to 2K−1, providing, as a k-th third intermediate signal, a sum of the jth second intermediate signal multiplied by $\cos(2\pi Jk(4j+1)/(4K))$, for j of from 0 to K−1, providing, as the k-th third intermediate signal, a sum of the jth second intermediate signal multiplied by $\sin(2\pi k(4(j-K)+1)/(4K))$, for k of from K to (2K−1), and providing, as a (m+kN/(2K))th output signal, a sum of the k-th third intermediate signal and a (m+kN/(2K))th third intermediate signal, for k of from 0 to K−1.

The integration and summation processing unit performs a processing operation of computing an output signal of the integration and summation processing unit from the second intermediate signal by a processing volume reduced by one half by grouping the second intermediate signals by each two terms by taking advantage of periodicity so that the number of output signals becomes equal to N/2.

The integration and summation processing unit performs a processing operation of computing an output signal of the integration and summation processing unit from the second intermediate signal by a processing volume reduced by one quarter by grouping the second intermediate signals by each four terms by taking advantage of periodicity so that the number of output signals becomes equal to N/2.

The pre-processing unit outputs a signal equivalent to an (n+N/4)th input signal for the value of n of from 0 to N/4 −1, a signal equivalent to a 3N/4−1-nth input signal reversed in sign for values of n of from N/4 to 3N/4−1 and a signal equivalent to an n−3N/4th input signal reversed in sign for values of n of from 3N/4−1.

According to the present invention, the integration and summation processing unit in the linear forward transforming unit or in the linear inverse transforming unit performs an integration and summation processing operations on an N/2 number of input signals outputted from the pre-processing unit by grouping the input signals by a K number of terms and performing the operations iteratively by an N/(2*K) number of times for producing a sum total of N/2 signals, for simplifying the constitution.

EMBODIMENTS

Figure 1:
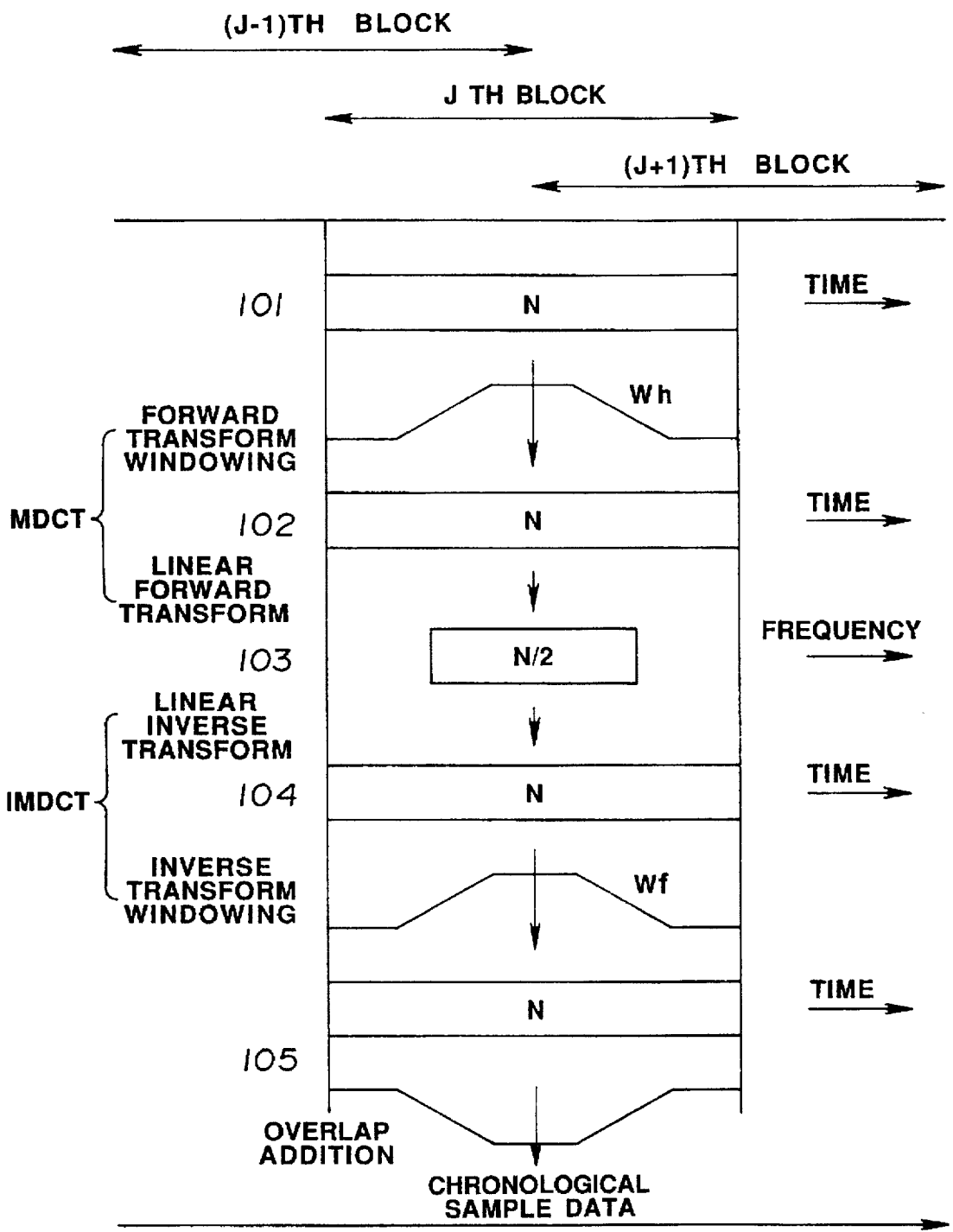
FIG. 1 is a diagrammatic view showing the operating sequence of modified DCT or MDCT operations and an inverse MDCT or IMDCT operations.

Referring to the drawings, preferred embodiments of the signal transforming device by the modified DCT is explained in detail.

Figure 2:
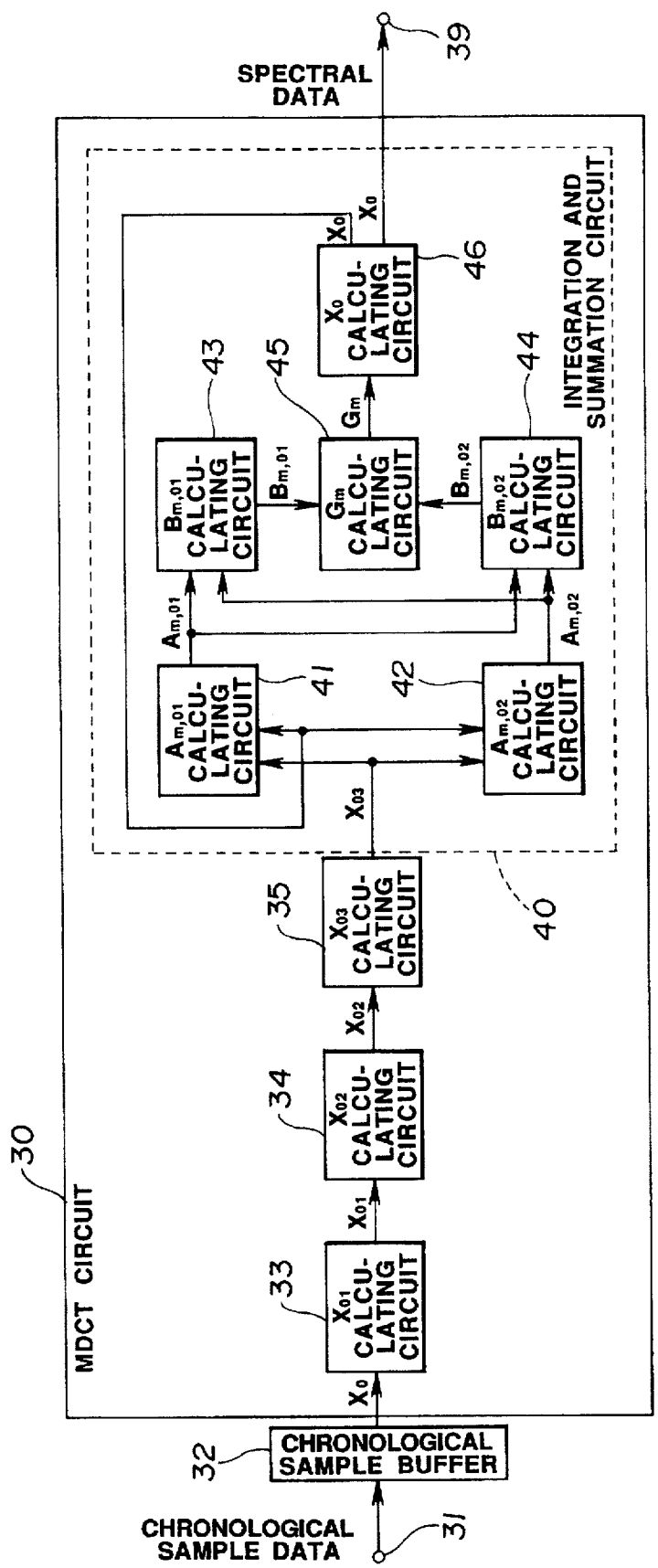
FIG. 2 is a block circuit diagram showing an arrangement for realizing an NDCT signal transforming method according to an illustrated embodiment.
Figure 3:
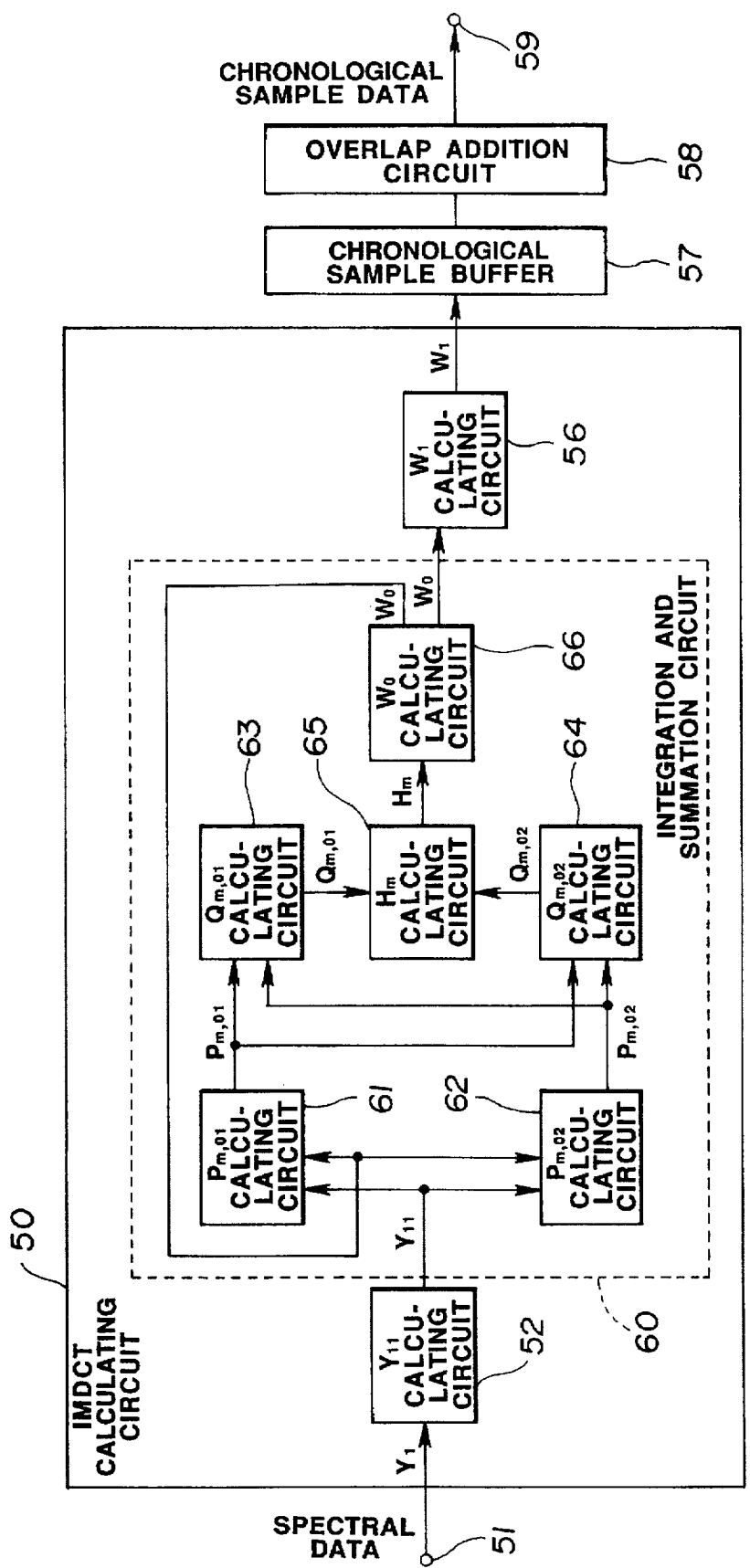
FIG. 3 is a block circuit diagram showing an arrangement for carrying out the IMDCT signal transforming method according to an illustrated embodiment.

Specifically, the signal transforming device by MDCT of the illustrated embodiment (MDCT processing circuit 30) has an arrangement as shown in FIG. 2, while the signal transforming device by IMDCT (IMDCT processing circuit 50) has an arrangement as shown in FIG. 3. Before proceeding to description of the signal transforming devices by MDCT and IMDCT of the embodiments shown in FIGS. 2 and 3, the basic principle of the signal processing method (signal transforming method) applied to these devices is explained.

With the signal processing method applied to the device of the present embodiment, a coefficient table shown by the following equations (14) to (16) is provided for an integer $m$ which is not less than 0 and not more than $(N/(2K)-1)$:

$$a_{m,l} = \cos(\pi(2m+1)(4K+1)/(2N)) \quad (14)$$
$$0 \leq l \leq N/2 - 1$$
$$b_{m,l} = \sin(\pi(2m+1)(4K1+1)/(2N)) \quad (15)$$
$$c_{m,l} = \cos(2\pi(2m+1)(j/N))$$
$$0 \leq j \leq K - 1$$
$$d_{m,l} = \sin(2\pi(2m+1)(j/N)) \quad (16)$$
$$e_{k,j} = \cos(2\pi k(4j+1)/(4K))$$
$$0 \leq j \leq K/4 - 1$$
$$f_{k,j} = \sin(2\pi k(4j+1)/(4K))$$

For integers $m$ which is not less than 0 and no more than $(N/(2K)-1)$, the following calculation is made repeatedly.

First, using the coefficients of the equation (14), a K number of signals $A_{0l}$, as given by the equation (17), and a K number of signals $A_{02}$, as given by the equation (18), are calculated from $x_{03}$ of the equation (4).

$$A_{m,01}(j) = \sum_{l=0}^{N/(2K)-1} a_{m,l} x_{03}(K1+j) \quad (17)$$

$$0 \leq j \leq K - 1$$

$$A_{m,02}(j) = \sum_{l=0}^{N/(2K)-1} b_{m,l} x_{03}(K1+j) \quad (18)$$

$$0 \leq j \leq K - 1$$

Then, from the coefficient of the equation (15) and from these signals $A_{01}$, $A_{02}$, two signal trains or rows $B_{01}$, $B_{02}$, each being of a length K, are calculated as shown by the equations (19) and (20).

$$B_{m,01}(j) = c_{m,j} A_{m,01}(j) - d_{m,j} A_{m,02}(j) \quad (19)$$

$$0 \leq j \leq K - 1$$

$$B_{m,02}(j) = -d_{m,j} A_{m,01}(j) - c_{m,j} A_{m,02}(j) \quad (20)$$

$$0 \leq j \leq K - 1$$

Using the coefficients of the equation (16) and $B_{01}$, $B_{02}$, a K number of signals $X_0$ are obtained, as shown by the equation (21).

$$X_0(m + kN/(2K)) = \sum_{j=0}^{K-1} e_{k,j} B_{m,01}(j) + \sum_{j=0}^{K-1} f_{k,j} B_{m,02}(j) \quad (21)$$

$$0 \leq m \leq N/(2K) - 1$$

$$0 \leq k \leq K - 1$$

This is coincident with $y_0$ as $y_0$ defined by the equation (1), as may be seen from the following:

First, from the relationship of the equations (1), (2), (3) and (4), the equation (22) holds:

$$y_0(k) = \sum_{n=0}^{N-1} x_{01}(n)\cos(2\pi(2k+1)(4n+N+2)/(8N)) = \quad (22)$$

$$\sum_{n=N/4}^{5N/4-1} x_{01}(n-N/4)\cos(2\pi(2k+1)(4(n-N/4)+N+2)/(8N)) =$$

$$\sum_{n=N/4}^{N-1} x_{01}(n-N/4)\cos(2\pi(2k+1)(2n+1)/(4N)) +$$

$$\sum_{n=N}^{5N/4-1} x_{01}(n-N/4)\cos(2\pi(2k+1)(2n+1)/(4N)) =$$

$$\sum_{n=N/4}^{N-1} x_{01}(n-N/4)\cos(2\pi(2k+1)(2n+1)/(4N)) +$$

$$\sum_{n=N}^{N/4-1} x_{01}(n+3N/4)\cos(2\pi(2k+1)(2(n+k)+1)/(4N)) =$$

$$\sum_{n=N/4}^{N-1} x_{01}(n-N/4)\cos(2\pi(2k+1)(2n+1)/(4N)) -$$

$$\sum_{n=N}^{N/4-1} x_{01}(n+3N/4)\cos(2\pi(2k+1)(2n+1)/(4N)) =$$

$$\sum_{n=0}^{N-1} x_{02}(n)\cos(2\pi(2k+1)(2n+1)/(4N)) =$$

$$\sum_{n=0}^{N/2-1} x_{02}(2n)\cos(2\pi(2k+1)(4n+1)/(4N)) +$$

$$\sum_{n=0}^{N/2-1} x_{02}(2n+1)\cos(2\pi(2k+1)(2(2n+1)+1)/(4N)) =$$

$$\sum_{n=0}^{N/2-1} x_{02}(2n)\cos(2\pi(2k+1)(4n+1)/(4N)) +$$

$$\sum_{n=0}^{N/2-1} x_{02}(N-1-2n)\cos(2\pi(2k+1)(2N-1-4n)/(4N)) =$$

$$\sum_{n=0}^{N/2-1} x_{02}(2n)\cos(2\pi(2k+1)(4n+1)/(4N)) -$$

$$\sum_{n=0}^{N/2-1} x_{02}(N-1-2n)\cos(2\pi(2k+1)(-1-4n)/(4N)) =$$

$$\sum_{n=0}^{N/2-1} (x_{02}(2n) - x_{02}(N-1-2n))\cos(2\pi(2k+1)(4n+1)/(4N)) =$$

$$\sum_{n=0}^{N/2-1} x_{03}(n)\cos(2\pi(2k+1)(4n+1)/(4N))$$

Modifying this, the equation (23) is derived.

$$y_0(m + kN/(2K)) = \quad (23)$$

$$\sum_{l=0}^{N/2-1} x_{03}(l)\cos(\pi(m + 2(kN/(2K)) + 1)(4l+1)/(2N)) =$$

-continued $$\sum_{l=0}^{N/2-1} x_{03}(l)\cos(\pi(2m+1)(4l+1)/(2N) + 2\pi k(4l+1)/4K) =$$

$$\sum_{j=0}^{K-1} \sum_{l=0}^{N/(2K)-1} x_{03}(Kl+j)\cos(\pi(2m+1)(4(Kl+j)+1)/(2N) +$$

$$2\pi k(4(Kl+j)+1)/(4K)) =$$

$$\sum_{j=0}^{K-1} \sum_{l=0}^{N/(2K)-1} x_{03}(Kl+j)\cos(\pi(2m+1)(4Kl+1)/(2N) +$$

$$2\pi(2m+1)j/N + 2\pi k(4j+1)/(4K)) =$$

$$\sum_{j=0}^{K-1} \cos(2\pi(2m+1)j/N + 2\pi k(4j+1)/(4N)) \times$$

$$\sum_{l=0}^{N/(2K)-1} x_{03}(Kl+j)\cos(\pi(2m+1)(4Kl+1)/(2N)) -$$

$$\sum_{j=0}^{K-1} \sin(2\pi(2m+1)j/N + 2\pi k(4j+1)/(4K)) \times$$

$$\sum_{l=0}^{N/(2K)-1} x_{03}(Kl+j)\sin(\pi(2m+1)(4Kl+1)/(2N))$$

$$0 \leq k \leq K-1$$

Using the equations (14), (15), (17) and (18), the equation (24) is derived.

$$y_0(m + kN/(2K)) = \tag{24}$$

$$\sum_{j=0}^{K-1} \cos(2\pi(2m+1)j/N + 2\pi k((4j+1)/(4K))A_{m,01}(j) -$$

$$\sum_{j=0}^{K-1} \sin(2\pi(2m+1)j/N + 2\pi k((4j+1)/(4K))A_{m,02}(j) =$$

$$\sum_{j=0}^{K-1} \cos(2\pi(2m+1)j/N)\cos(2\pi k(4j+1)/(4K))A_{m,01}(j) -$$

$$\sum_{j=0}^{K-1} \sin(2\pi(2m+1)j/N)\sin(2\pi k(4j+1)/(4K))A_{m,01}(j) -$$

$$\sum_{j=0}^{K-1} \sin(2\pi(2m+1)j/N)\cos(2\pi k(4j+1)/(4K))A_{m,02}(j) -$$

$$\sum_{j=0}^{K-1} \cos(2\pi(2m+1)j/N)\sin(2\pi k(4j+1)/(4K))A_{m,02}(j) =$$

$$\sum_{j=0}^{K-1} c_{m,j}\cos(2\pi k(4j+1)/(4K))A_{m,01}(j) -$$

$$\sum_{j=0}^{K-1} d_{m,j}\sin(2\pi k(4j+1)/(4K))A_{m,01}(j) -$$

$$\sum_{j=0}^{K-1} d_{m,j}\cos(2\pi k(4j+1)/(4K))A_{m,02}(j) -$$

$$\sum_{j=0}^{K-1} c_{m,j}\sin(2\pi k(4j+1)/(4K))A_{m,02}(j) =$$

$$\sum_{j=0}^{K-1} \cos(2\pi k(4j+1)/(4K))(c_{m,j}A_{m,01}(j) - d_{m,j}A_{m,02}(j)) +$$

$$\sum_{j=0}^{K-1} \sin(2\pi k(4j+1)/(4K))(-d_{m,j}A_{m,01}(j) - c_{m,j}A_{m,02}(j)) =$$

$$\sum_{j=0}^{K-1} \cos(2\pi k((4j+1)/(4K))B_{m,01}(j)) +$$

$$\sum_{j=0}^{K-1} \sin(2\pi k((4j+1)/(4K))B_{m,02}(j))$$

$$0 \leq k \leq K-1$$

From the equations (19) and (20), the equation (24) is changed to the equation (25).

$$y_0(m + kN/(2K)) = \sum_{j=0}^{K-1} e_{k,j}B_{m,01}(j) + \sum_{j=0}^{K-1} f_{k,j}B_{m,02}(j)) \tag{25}$$

$$0 \leq m \leq N/(2K) - 1, 0 \leq k \leq K-1$$

This coincides with the equation (21) for the method embodying the present invention. It follows from this that the MDCT processing may be achieved with the method embodying the present invention.

If the periodicity of the equation (16) is utilized, the amount of convolution processing of the equation (21) may be reduced to one half or to a quarter.

That is, the coefficient of the equation (16) is modified to the form shown in Equations (26) and (27).

$$\begin{aligned}
e_{2k+p,j+K/2} &= \cos(2\pi(2k+p)(4(j+K/2)+1)/(4K)) \\
&= \cos(2\pi(2k+p)(4j+1)/(4K) + (2k+p)\pi) \\
&= (-1)^p e_{2k+p,j}
\end{aligned} \tag{26}$$

$$p = 0, 1$$

$$\begin{aligned}
f_{2k+p,j+K/2} &= \sin(2\pi(2k+p)(4(j+K/2)+1)/(4K)) \tag{27} \\
&= \sin(2\pi(2k+p)(4j+1)/(4K) + (2k+p)\pi) \\
&= (-1)^p f_{2k+p,j}
\end{aligned}$$

$$p = 0, 1$$

Therefore, as shown by equation (28), by setting, as shown by the equation (28), $$E_{m,0}(j) = B_{m,01}(j) + B_{m,01}(j + K/2) \tag{28}$$

$$E_{m,1}(j) = B_{m,01}(j) - B_{m,01}(j + K/2)$$

$$F_{m,0}(j) = B_{m,02}(j) + B_{m,02}(j + K/2)$$

$$F_{m,1}(j) = B_{m,02}(j) - B_{m,02}(j + K/2)$$

$$0 \leq j \leq K/2 - 1$$

$x_0$ is expressed as shown by the equation (29), so that the amount of integration and summation processing operations is halved.

$$X_0(m + (2k+p)N/(2K)) = \sum_{j=0}^{K/2-1} e_{2k+p,j}E_{m,p}(j) + \sum_{j=0}^{K/2-1} f_{2k+p,j}F_{m,p}(j) \tag{29}$$

$$P = 0, 1\ 0 \leq m \leq N/(2K) - 1,$$
$$0 \leq k \leq K/2 - 1$$

Besides, since the coefficient of the equation (16) may also be expressed as shown by the equations (30), (31)

$$\begin{aligned}
e_{4k+p,j+qK/4} &= \cos(2\pi(4k+p)(4(j+qK/4)+1)/(4K)) \tag{30} \\
&= \cos(2\pi(4k+p)(4j+1)/(4K) + pq\pi/2) \\
&= \cos(pq\pi/2)e_{4k+p,j} - \sin(pq\pi/2)f_{4k+p,j}
\end{aligned}$$

$$p = 0, 1, 2, 3, \quad q = 0, 1, 2, 3$$

$$\begin{aligned}
f_{4k+p,j+qK/4} &= \sin(2\pi(4k+p)(4(j+qK/4)+1)/(4K)) \tag{31} \\
&= \sin(2\pi(4k+p)(4j+1)/(4K) + pq\pi/2) \\
&= \sin(pq\pi/2)e_{4k+p,j} - \sin(pq\pi/2)f_{4k+p,j}
\end{aligned}$$

$$p = 0, 1, 2, 3, \quad q = 0, 1, 2, 3$$

the equation (32) holds.

$$y_0(m + (4k + p)N/(2K)) = \sum_{j=1}^{K/4-1} \sum_{q=0}^{3} e_{4k+p,j+qK/4} B_{m,01}(j + qK/4) - \quad (32)$$

$$\sum_{j=1}^{K/4-1} \sum_{q=0}^{3} f_{4k+p,j+qK/4} B_{m,02}(j + qK/4) =$$

$$\sum_{j=1}^{K/4-1} \sum_{q=0}^{3} (\cos(pq\pi/2)e_{4k+p,j} - \sin(pq\pi/2)f_{4k+p,j}) B_{m,01}(j + qK/4) -$$

$$\sum_{j=1}^{K/4-1} \sum_{q=0}^{3} (\sin(pq\pi/2)e_{4k+p,j} + \cos(pq\pi/2)f_{4k+p,j}) B_{m,02}(j + qK/4) =$$

$$\sum_{j=1}^{K/4-1} e_{4k+p,j} \sum_{q=0}^{3} (\cos(pq\pi/2)B_{m,01}(j + qK/4) -$$

$$\sin(pq\pi/2)B_{m,02}(j + qK/4) -$$

$$\sum_{j=1}^{K/4-1} f_{4k+p,j} \sum_{q=0}^{3} (\sin(pq\pi/2)B_{m,01}(j + qK/4) +$$

$$\cos(pq\pi/2)B_{m,02}(j + qK/4)) -$$

$$0 \leq m \leq N/(2K) - 1, 0 \leq k \leq K/4 - 1, p = 0, 1, 2, 3$$

Since one of sine and cosine values in the equation (31) is $\leq 1$, with the other value being 0, by setting so that, as shown in equation (33) and equation (34)

$$(33)$$

$$G_{m,0}(j) = B_{m,01}(j) + B_{m,01}(j + K/4) + B_{m,01}(j + 2K/4) + M_{m,01}(j + 3K/4)$$

$$G_{m,1}(j) = B_{m,01}(j) + B_{m,02}(j + K/4) - B_{m,01}(j + 2K/4) - M_{m,01}(j + 3K/4)$$

$$G_{m,2}(j) = B_{m,01}(j) - B_{m,01}(j + K/4) + B_{m,01}(j + 2K/4) - M_{m,01}(j + 3K/4)$$

$$G_{m,3}(j) = B_{m,01}(j) - B_{m,02}(j + K/4) - B_{m,01}(j + 2K/4) + M_{m,02}(j + 3K/4)$$

$$G_{m,0}(j + K/4) = B_{m,02}(j) + B_{m,02}(j + K/4) +$$

$$B_{m,02}(j + 2K/4) + M_{m,02}(j + 3K/4)$$

$$G_{m,1}(j + K/4) = B_{m,02}(j) - B_{m,02}(j + K/4) -$$

$$B_{m,02}(j + 2K/4) + M_{m,01}(j + 3K/4)$$

$$G_{m,2}(j + K/4) = B_{m,02}(j) - B_{m,02}(j + K/4) +$$

$$B_{m,02}(j + 2K/4) - M_{m,02}(j + 3K/4)$$

$$G_{m,3}(j + K/4) = B_{m,02}(j) + B_{m,01}(j + K/4) -$$

$$B_{m,02}(j + 2K/4) - M_{m,02}(j + 3K/4)$$

$$0 \leq j \leq K/4 - 1$$

$$g_{k,j} = \begin{cases} \cos(2\pi k(4j + 1)/4K)) & 0 \leq j \leq K/4 - 1 \\ \sin(2\pi k(4(j - K/4) + 1)/(4K)) & K/4 \leq j \leq K/2 - 1 \end{cases} \quad (34)$$

the equation (35)

$$X_0(m + (4k + p)N/(2K)) = \sum_{j=0}^{K/2-1} g_{4k+p,j} G_{m,p}(j) \quad (35)$$

$$0 \leq k \leq K/4 - 1, \quad p = 0, 1, 2, 3$$

holds, so that the volume of the integration and summation operation of the equation (21) may be halved.

Besides, in carrying out the operation of IMDCT with the signal processing method of the present invention, coefficient tables of the equations (14), (15) and (16), which are the same as those for MDCT, are used for integers $\underline{m}$ which are not less than 0 and not more than (N/(2K)−1). The following operations are repeated for integers $\underline{m}$ which are not less than 0 and not more than (N/(2K)−1).

First, using the coefficients of the equation (14), a K number of signals $P_{O1}$ as given by the equation (36)

$$P_{m,01}(j) = \sum_{l=0}^{N/(2K)-1} a_{m,l} y_{11}(Kl + j) \quad (36)$$

$$0 \leq j \leq K - 1$$

and a K number of signals $P_{O2}$ as given by the equation (37)

$$P_{m,02}(j) = \sum_{l=0}^{N/(2K)-1} b_{m,l} y_{11}(Kl + j) \quad (37)$$

$$0 \leq j \leq K - 1$$

are calculated from $y_{11}$ of the equation (9).

Then, from the coefficients of equation (15) and from these signals $P_{O1}$, $P_{O2}$, two signal trains $Q_{O1}$, $Q_{O2}$, each having a length K, are calculated, as shown by the following equations (38), (39):

$$Q_{m,01}(j) = c_{m,j} P_{m,01}(j) - d_{m,j} A_{m,02}(j) \quad (38)$$
$$0 \leq j \leq K - 1$$

$$Q_{m,02}(j) = -d_{m,j} P_{m,01}(j) - c_{m,j} A_{m,02}(j) \quad (39)$$
$$0 \leq j \leq K - 1$$

Then, using the coefficients of equation (16) and $B_{O1}$, $B_{O2}$, a K number of signals $W_0$ are obtained, as shown by the equation (40):

$$W_0(m + kL/(2K)) = \sum_{j=0}^{K-1} e_{k,j} Q_{m,01}(j) + \sum_{j=0}^{K-1} f_{k,j} Q_{m,02}(j) \quad (40)$$

$$0 \leq m \leq N/(2K) - 1, 0 \leq k \leq K - 1$$

These signals $W_0$, obtained by the equation (40), are processed with a sign change, re-arraying and windowing for inverse transform, as shown by the equation (41), for calculating an N number of $W_1$:

$$W_1(n) = \begin{cases} f(n)W_0(n + N/4) & 0 \leq n \leq N/4 - 1 \\ -f(n)W_0(3N/4 - 1 - n) & N/4 \leq n \leq 3N/4 - 1 \\ -f(n)W_0(n - 3N/4) & 3N/4 \leq n \leq N/1 \end{cases} \quad (41)$$

This may be found to be coincident with $x_1$ defined by equation (8) as shown by the following.

First, an equation (42) holds from the equations (8) and (9).

$$x_1(n - N/4) = C_1 f(n) \sum_{k=0}^{N/2-1} y_1(k)\cos(2\pi(k + 1/2)(n + 1/2)/N) \quad (42)$$

$$= C_1 f(n) \sum_{l=0}^{N/4-1} y(2l)\cos(2\pi(2l + 1/2)(n + 1/2)/N) -$$

$$\sum_{l=0}^{N/4-1} y(2l + 1)\cos(2\pi(2l + 1 + 1/2)(n + 1/2)/N)$$

$$= C_1 f(n) \sum_{l=0}^{N/4-1} y(2l)\cos(2\pi(2l + 1/2)(n + 1/2)/N) -$$

$$\sum_{l=N/4}^{N/2-1} y(2l + 1)\cos(2\pi(N - 1 - 2l)(n + 1/2)/N)$$

$$= C_1 f(n) \sum_{l=0}^{N/4-1} y(2l)\cos(2\pi(2l + 1/2)(n + 1/2)/N) -$$

$$\sum_{l=N/4}^{N/2-1} y(N - 1 - 2l)\cos(2\pi(N - 2l - 1/2)(n + 1/2)/N)$$

$$= C_1 f(n) \sum_{l=0}^{N/4-1} y(2l)\cos(2\pi(2l + 1/2)(n + 1/2)/N) -$$

$$\sum_{l=N/4}^{N/2-1} y(N - 1 - 2l)\cos(2\pi(-2l - 1/2)(n + 1/2)/N)$$

-continued $$= C_1 f(n) \sum_{l=0}^{N/4-1} y(2l)\cos(2\pi(2l + 1/2)(n + 1/2)/N) -$$

$$\sum_{l=N/4}^{N/2-1} y(N - 1 - 2l)\cos(2\pi(2l + 1/2)(n + 1/2)/N)$$

$$= C_1 f(n) \sum_{l=0}^{N/4-1} y_{11}(l)\cos(2\pi(2l + 1/2)(n + 1/2)/N) -$$

$$\sum_{l=N/4}^{N/2-1} y_{11}(l)\cos(2\pi(2l + 1/2)(n + 1/2)/N)$$

$$= C_1 f(n) \sum_{l=0}^{N/2-1} y_{11}(l)\cos(2\pi(2l + 1/2)(n + 1/2)/N)$$

If the equation (43)

$$u(n) = \sum_{l=0}^{N/2-1} y_{11}(l)\cos(2\pi(2l + 1/2)(n + 1/2)/N) \quad (43)$$

is set, an equation (44)

$$u(n + kN/(2K)) = \sum_{j=0}^{K-1} \cos(2\pi k(4j + 1)/(4K))Q_{m,01}(j) + \quad (44)$$

$$\sum_{j=0}^{K-1} \sin(2\pi k(4j + 1)/(4K))Q_{m,02}(j)$$

holds from the equations (14), (15), (36), (37), (38) and (39), in the same manner as the equation (24).

Since the equations (45) and (46)

$$u(n + N) = \sum_{l=0}^{N/2-1} y_{11}(l)\cos(2\pi(2l + 1/2)(n + N + 1/2)/N) \quad (45)$$

$$= \sum_{l=0}^{N/2-1} y_{11}(l)\cos(2\pi(2l + 1/2)(n + 1/2)/N + (4l + 1)\pi)$$

$$= -\sum_{l=0}^{N/2-1} y_{11}(l)\cos(2\pi(2l + 1/2)(n + N + 1/2)/N)$$

$$= -u(n)$$

$$u(N/2 - 1 - n) = \sum_{l=0}^{N/2-1} y_{11}(l)\cos(2\pi(2l + 1/2)(N/2 - 1 - n + 1/2)/N) \quad (46)$$

$$= \sum_{l=0}^{N/2-1} y_{11}(l)\cos(2\pi(2l + 1/2)(N/2 - n - 1/2)/N)$$

$$= \sum_{l=0}^{N/2-1} y_{11}(l)\cos(2\pi(2l + 1/2)(-N/2 + n + 1/2)/N)$$

$$= u(-N/2 + n)$$

$$= -u(N/2 + n)$$

hold from the equation (43), the equation (47)

$$u(n + kN/(2K)) = \sum_{j=0}^{K-1} e_{k,j}Q_{m,01}(j) + \sum_{j=0}^{K-1} f_{k,j}Q_{m,02}(j) \quad (47)$$

$$0 \leq m \leq N/(2K) - 1, 0 \leq k \leq K - 1$$

holds on comparison with the equation (41), so that it is seen that the IMDCT calculation may be realized with the method of the illustrated embodiment of the present invention.

It is noted that, as in the case of MDCT, the volume of the integration and summation operations of the equation (40) may be reduced to one half or to one quarter by taking advantage of the periodicity of the equation (16).

First, if equations (48)

$$S_{m,0}(j) = Q_{m,01}(j) + Q_{m,01}(j + K/2) \quad (48)$$
$$S_{m,1}(j) = Q_{m,01}(j) - Q_{m,01}(j + K/2)$$
$$T_{m,0}(j) = Q_{m,02}(j) + Q_{m,02}(j + K/2)$$
$$T_{m,1}(j) = Q_{m,02}(j) - Q_{m,02}(j + K/2)$$
$$0 \leq j \leq K/2 - 1$$

are set, an equation (49)

$$W_0(m + (2k + p)N/(2K)) = \sum_{j=0}^{N/2-1} e_{2k+p,j}S_{m,p}(j) + \sum_{j=0}^{N/2-1} f_{2k+p,j}T_{m,p}(j) \quad (49)$$

$$0 \leq m \leq N/(2K) - 1, 0 \leq k \leq K/2 - 1, p = 0, 1$$

holds, if the equations (26), (27) are used, so that the volume of integration and summation operations of the equation (40) may be reduced by one half.

On the other hand, if the equations (30), (31) are used, an equation (50)

$$u(n + (4k + p)N/(2K)) = \quad (50)$$

$$\sum_{j=0}^{N/4-1} e_{4k+p,j} \sum_{q=0}^{3} (\cos(pq\pi/2)Q_{m,01}(j + qK/4) -$$

$$\sin(pq\pi/2)Q_{m,02}(j + qK/4)) -$$

$$\sum_{j=0}^{N/4-1} f_{4k+p,j} \sum_{q=0}^{3} (\sin(pq\pi/2)Q_{m,01}(j + qK/4) +$$

$$\cos(pq\pi/2)Q_{m,02}(j + qK/4))$$

$$0 \leq m \leq N/(2K) - 1, 0 \leq k \leq K/4 - 1, p = 0, 1, 2, 3$$

holds. Since one of sine and cosine values in the equation (50) is $\leq 1$, with the other value being 0, by setting so that, as shown in equation (51)

$$H_{m,0}(j) = Q_{m,01}(j) + Q_{m,01}(j + K/4) + Q_{m,01}(j + 2K/4) + Q_{m,01}(j + 3K/4) \quad (51)$$

$$H_{m,1}(j) = Q_{m,01}(j) + Q_{m,02}(j + K/4) - Q_{m,01}(j + 2K/4) - Q_{m,01}(j + 3K/4)$$

$$H_{m,2}(j) = Q_{m,01}(j) - Q_{m,01}(j + K/4) + Q_{m,01}(j + 2K/4) - Q_{m,01}(j + 3K/4)$$

$$H_{m,3}(j) = Q_{m,01}(j) - Q_{m,02}(j + K/4) - Q_{m,01}(j + 2K/4) + Q_{m,02}(j + 3K/4)$$

$$H_{m,0}(j + K/4) = Q_{m,02}(j) + Q_{m,02}(j + K/4) +$$
$$Q_{m,02}(j + 2K/4) + Q_{m,02}(j + 3K/4)$$

$$H_{m,1}(j + K/4) = Q_{m,02}(j) - Q_{m,01}(j + K/4) -$$
$$Q_{m,02}(j + 2K/4) + Q_{m,01}(j + 3K/4)$$

$$H_{m,2}(j + K/4) = Q_{m,02}(j) - Q_{m,02}(j + K/4) +$$
$$Q_{m,02}(j + 2K/4) - Q_{m,02}(j + 3K/4)$$

$$H_{m,3}(j + K/4) = Q_{m,02}(j) + Q_{m,01}(j + K/4) -$$
$$Q_{m,02}(j + 2K/4) - Q_{m,01}(j + 3K/4)$$

$$0 \leq j \leq K/4 - 1$$

and by using the equation (34), an equation (52)

$$W_0(m + (4k + p)N/(2K)) = \sum_{j=0}^{N/2-1} g_{4k+p,j}H_{m,p}(j) \quad (52)$$

$$0 \leq k \leq K/4 - 1, p = 0, 1, 2, 3$$

holds, so that the volume of the integration and summation operations of equation (40) may be reduced to a quarter.

It is seen from above that, with the method of the present invention, both MDCT defined by the equation (19 and IMDCT defined by the equation (3) may be realized by integration of a k number of terms end summation, so that outputting of an N/2 number of signals may be executed by $N*N/(2K)+6N+KN/4$ number of times of integration and summation operations and a $K*K/2+N+N*N/(8*K*K)$ number of coefficient tables, so that the MDCT and IMDCT operations may be realized by a simpler hardware even although the number of times of the processing operations and the coefficient tables are increased as compared to the conventional method.

Returning to FIG. 2 and those following, a preferred embodiment for practicing the above-mentioned principle of the illustrated embodiment of the present invention is explained.

That is, a signal transforming device for MDCT (MDCT calculation circuit 30) of the illustrated embodiment comprises an $x_{O1}$ calculating circuit 34, as a forward transforming window unit for multiplying an input signal with a forward transforming window, and circuit components inclusive of an $x_{O2}$ calculating circuit 34 as a linear forward transforming unit for linear forward transforming an output signal of the $x_{O1}$ calculating circuit 33, and is adapted for processing an N number of samples of input signals. The linear forward transforming unit includes an $x_{O2}$ calculating circuit 34 and an $x_{O3}$ calculating circuit 35, as pre-processing units for pre-processing an output signal of the $x_{O1}$ calculating circuit 33, and an integration and summation circuit 40 for processing an output signal of the pre-processing unit with integration and summation operations. The integration and summation circuit 40 executes integration and summation on an N/2 number of the input signals supplied from the pre-processing unit. The integration is executed on each of a K number of terms of the input signals, grouped together as a processing unit for integration. The integration and summation operations are iteratively performed an $N/(2*K)$ number of times for outputting a sum total of N/2 signals.

Figure 4:
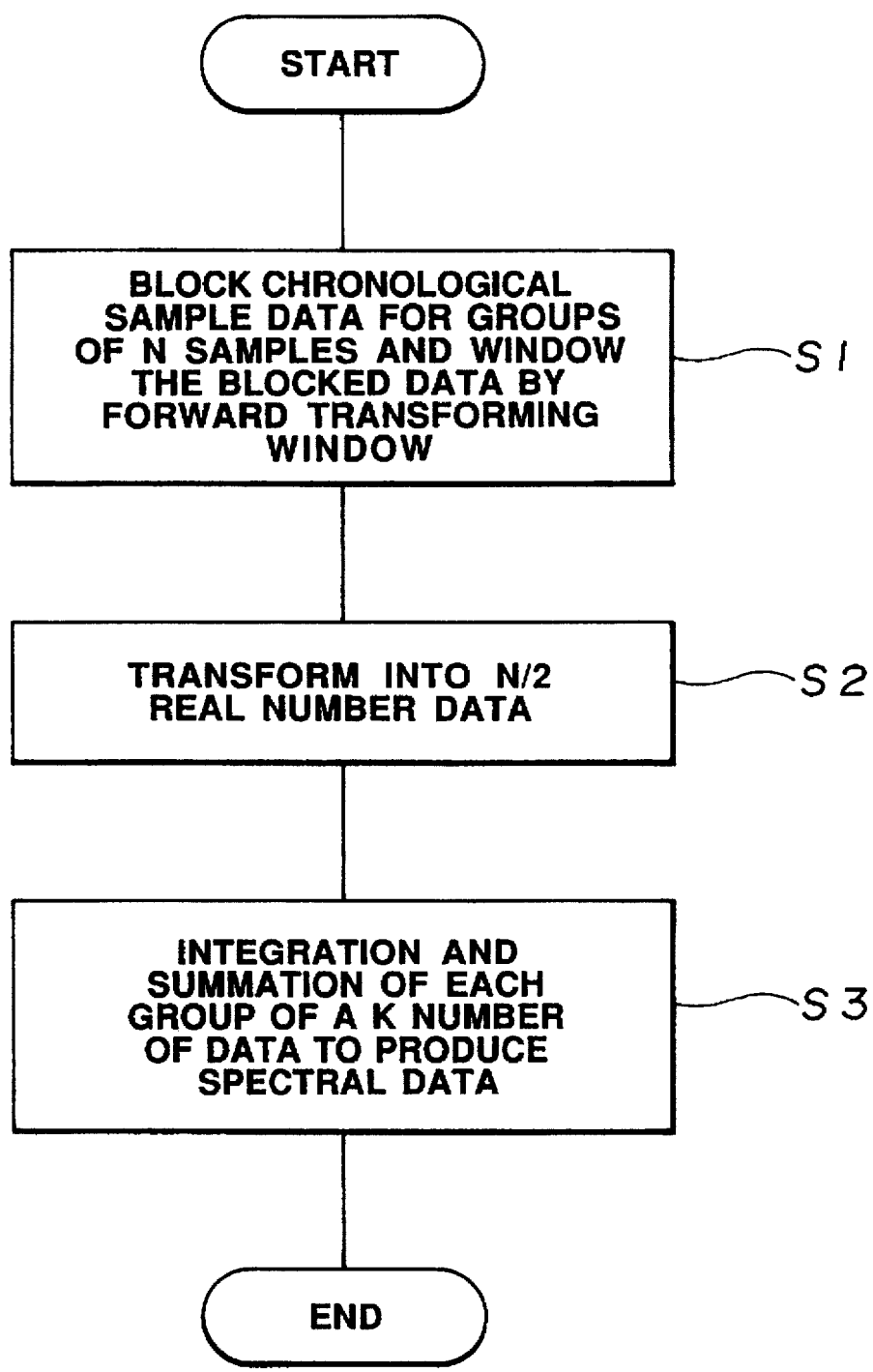
FIG. 4 is a flow chart showing the process steps of a basic embodiment of an MDCT signal transforming method according to an illustrated embodiment.

In a flow chart of FIG. 4, the signal transforming sequence in the embodiment of FIG. 2 for executing MDCT operations by the method of the present invention is shown. At a first step S1 in FIG. 4, chronological sample data, such as PCM audio data, are grouped into blocks each made up of a predetermined number of, herein N samples. The blocks are set so that an overlap with neighboring blocks amounts to 50%, that is the neighboring blocks are overlapped by N/2 samples, as described in connection with FIG. 1, and sample data of the respective blocks are multiplied by a forward transforming window Wh, as described in connection with FIG. 1. These filtered N-samples of the chronological data $x_{O1}$ are modified at the next step S2 as shown by the equations (3) and (4) for transformation into an N/2 number of real number data $x_{O3}$. At the next step S3, calculations shown by the equations (17) to (20), (29) and (31) are executed on $x_{O3}$ to find the N/2 number of spectral data $x_O$ which are outputted as MDCT output data.

The above-described transformation for MDCT is executed by a signal transforming device for MDCT of the present embodiment, an illustrative hardware for realizing the transformation for MDCT, shown in FIG. 2. In the signal transforming device, shown in FIG. 2, chronological sample data $x_O$, stored in chronological sample buffer 32, is transformed by an MDCT calculating circuit 30 for executing the signal transforming method for MDCT into spectral data which is outputted at an output terminal 39.

Specifically, the MDCT calculating circuit 30 comprises an $x_{O1}$ calculating circuit 33 for executing a processing on the chronological sample data $x_O$ according to equation (2) to find the chronological data $x_{O1}$, an $x_{O2}$ calculating circuit 34 for executing calculations according to equation (3) on the chronological data $x_{O1}$ to find data $x_{O2}$, an $x_{O3}$ calculating circuit 35 for executing calculations according to equation (4) on the data $x_{O2}$ to find data $x_{O3}$, and an integration and summation circuit 40 for executing calculations according to equations (17) to (20), equations (33) and (35) on the data $x_{O3}$ to find spectral data $x_O$.

Specifically, the integration and summation circuit 40 comprises an $A_{m,O1}$ calculating circuit 41 for executing a processing according to equation (17) using data $x_{O3}$ and an output of an $x_O$ calculating circuit 46 as later explained to find data $A_{m,O1}$, an $A_{m,O2}$ calculating circuit 42 for executing a processing according to equation (18) using the data $x_{O3}$ and the output of the $x_O$ calculating circuit 46 to find data $A_{m,O2}$, a $B_{m,O1}$ calculating circuit 43 for executing a processing according to equation (19) to find data $B_{m,O1}$, a $B_{m,O2}$ calculating circuit 44 for executing a processing according to equation (20) to find data $B_{m,O2}$, a $G_m$ calculating circuit 45 for executing a processing according to equation (33) using the data $B_{m,O1}$ and data $B_{m,O2}$ to find data $G_m$, and an $x_O$ calculating circuit 46 for executing a processing according to equation (35) to find spectral data $x_O$.

Meanwhile, the $x_{O1}$ calculating circuit 33 as a forward transforming window unit, and the $x_{O2}$ calculating circuit 34, as a pre-processing unit for the linear forward transforming unit, may be grouped into one circuit.

A signal transforming device for IMDCT according to an embodiment of the present invention (IMDCT calculating circuit 50) comprises a linear inverse transforming unit for executing linear inverse transform on an input signal and an inverse transforming window unit for multiplying an output signal of the linear inverse transforming unit with an inverse transforming window, as shown in FIG. 3, and is adapted for performing inverse transform operations on an N/2 number of independent input signals. The linear inverse transforming unit 50 comprises a $y_{11}$ calculating circuit 52 for pre-processing an input signal, an integration and summation circuit 60 for executing integration and summation on an output signal of the $y_{11}$ calculating circuit 52, and a $W_1$ calculating circuit 56 for post-processing an output signal of the integration and summation circuit 60. The integration and summation circuit 60 executes integration and summation operations on the N/2 number of input signals supplied from the $y_{11}$ calculating circuit 52 by grouping the input signal into groups each made up of K terms, and iteratively performs the operations $N/(2*K)$ times to output a sum total of N/2 number of signals. Meanwhile, in the example of FIG. 3, the $W_1$ calculating circuit 56 is composed of the inverse transforming unit and a post-processing unit of the linear inverse transforming unit.

Figure 5:
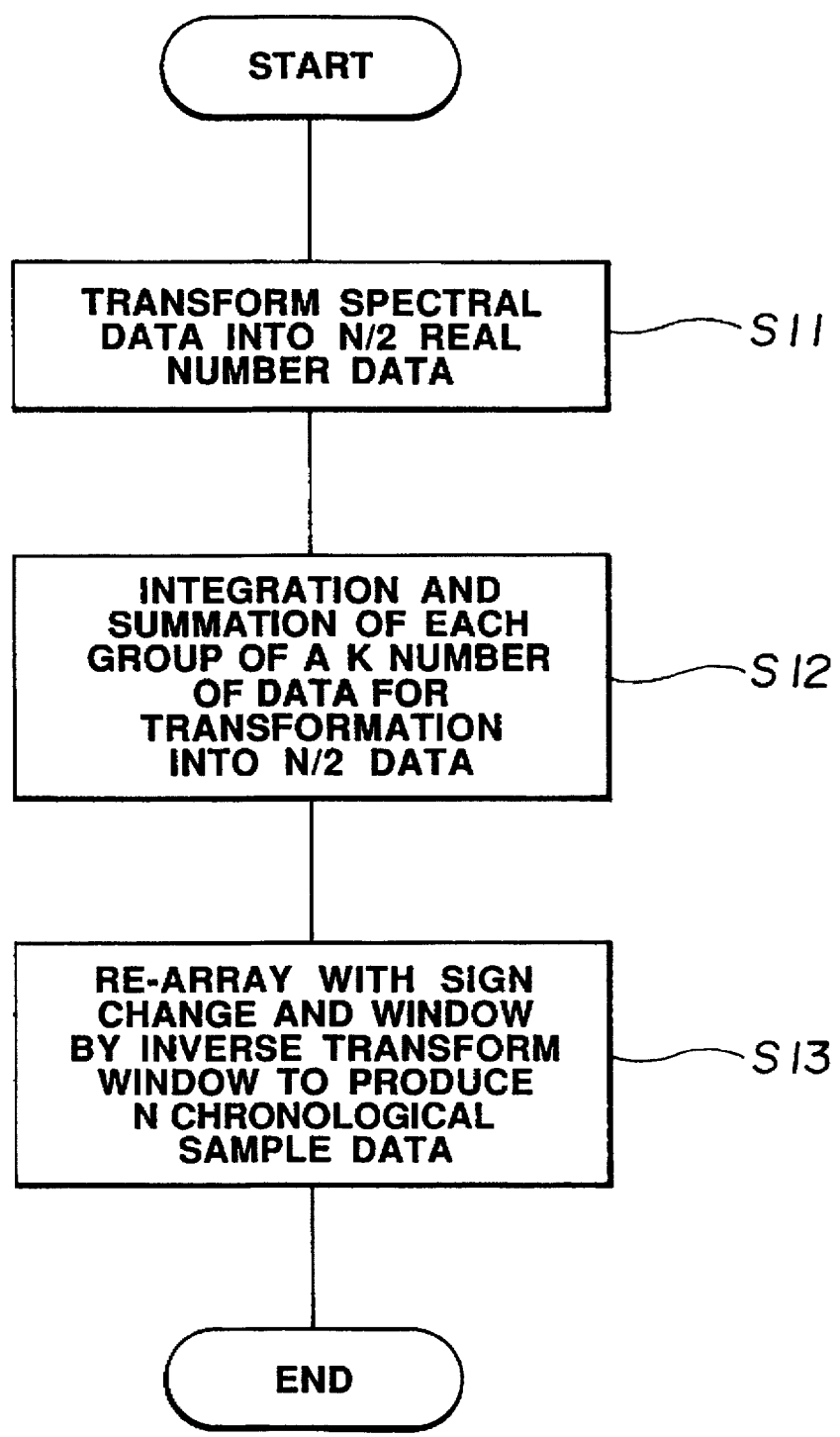
FIG. 5 is a flow chart showing the process steps of a basic embodiment of an IMDCT signal transforming method according to an illustrated embodiment.

In a flow chart of FIG. 5, the signal transforming sequence in the embodiment of FIG. 3 for executing IMDCT operations by the method of the present invention is shown. At a first step S11 shown in FIG. 5, an N/2 number of spectral data $y_1$ is processed by sign exchange and re-arraying as shown by equation (9) for being converted into an N/2 number of real number data $y_{11}$. At the next step S13, the real number data $y_{11}$ are processed by processing operations in accordance with equations (32) to (35), (43) and (44) to generate an N/2 number of data $W_O$. At the next step S13, the data $W_O$ are processed by transform processing as shown by equation (37) to find an N number of real number data $W_1$.

The above-described transform operations for IMDCT and the transform processing for constructing chronological data from the output of the IMDCT transform operations are executed by a signal transforming device for IMDCT of the present embodiment, an illustrative hardware for realizing the transformation for IMDCT, shown in FIG. 3. The spectral data $y_i$ from input terminal 51 are multiplied by an inverse transform window by a chronological data buffer 57 and subsequently summed to IMDCT output data of both neighboring blocks by an overlap addition circuit 58 before being outputted as chronological sample data at output terminal 59.

Specifically, the IMDCT calculating circuit 50 comprises a $y_{11}$ calculating circuit 52 for executing calculations on the spectral data $y_i$ in accordance with the equation (9) to find data $y_{11}$, an integration and summation circuit 60 for executing calculations on data $y_{11}$ in accordance with the equations (36) to (39), (51) and (52) to find data $W_0$, and a $W_1$ calculating circuit 56 for executing calculations on data $W_0$ in accordance with the equation (41) to find data $W_1$.

On the other hand, the integration and summation circuit 60 comprises a $P_{m,01}$ calculating circuit 61 for executing calculations on the data $y_{11}$ and an output of a $W_0$ calculating circuit 66 as later described to find data $P_{m,01}$, a $P_{m,02}$ calculating circuit 62 for executing calculations on the data $y_{11}$ and the output of $W_0$ calculating circuit 66 as later described to find data $P_{m,02}$, a $Q_{m,01}$ calculating circuit 63 for executing calculations on the data $p_{m,01}$ and $P_{m,02}$ in accordance with the equation (38) to find data $Q_{m,01}$, a $Q_{m,02}$ calculating circuit 64 for executing calculations on the data $p_{m,01}$ and $P_{m,02}$ in accordance with the equation (39) to find data $Q_{m,02}$, an $H_m$ calculating circuit 65 for executing calculations on data $Q_{m,01}$ and $Q_{m,02}$ in accordance with equation (51) to find data $H_m$ and a $W_0$ calculating circuit 66 for executing calculations on the data $H_m$ in accordance with equation (52) to find data $W_0$.

Figure 6:
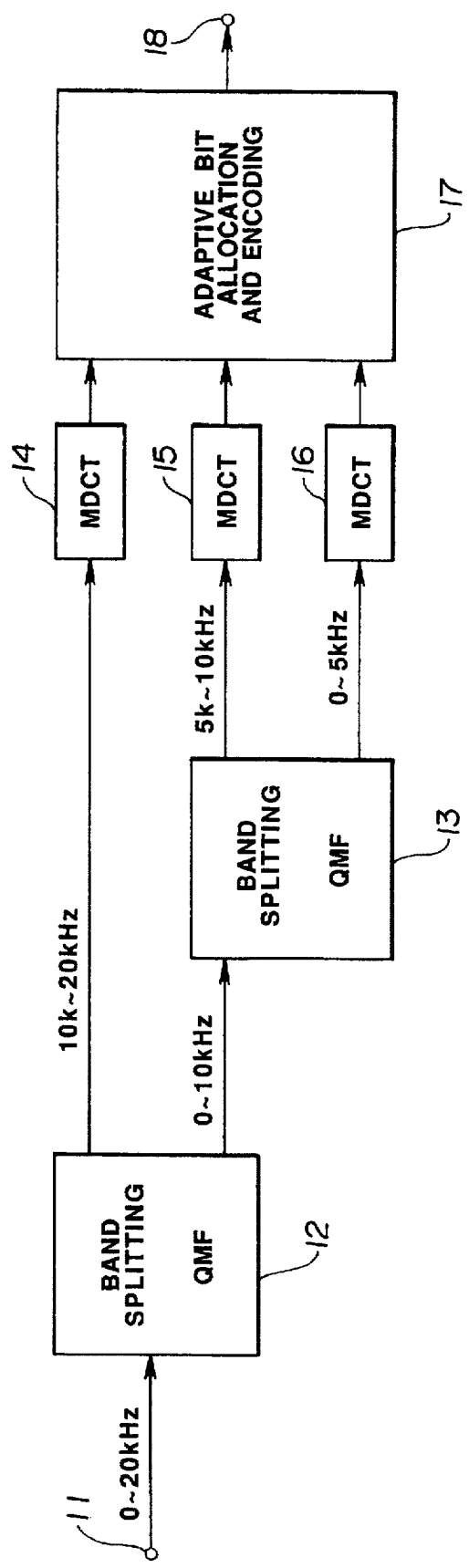
FIG. 6 is a block circuit diagram showing an example of a circuit of a high efficiency encoding device for carrying out the MDCT signal transforming method according to the illustrated embodiment.

Referring to FIG. 6, explanation is made of a concrete example of a high efficiency encoding device, to which MDCT as one of the above-described signal transforming operations of the illustrated embodiments is applied. The concrete high efficiency encoding device shown in FIG. 6 makes use of techniques of sub-band coding, adaptive transform coding and adaptive bit allocation. That is, with the high efficiency encoding device, shown in FIG. 6, input digital signals, such as input PCM audio signals, are split into plural frequency bands so that the bandwidth becomes broader towards the higher frequency. The band-limited signals are processed by MDCT, a kind of orthogonal transform processing operations, for each frequency band, to generate frequency-domain spectral data, which are then encoded by adaptive bit allocation for each of so-called critical bands.

That is, referring to FIG. 6, audio PCM signals in e.g. a range of from 0 to 20 kHz are supplied to input terminal 11. The input signals are split by a band-splitting filter 12, such as a so-called a quadrature mirror filter (QMF), into a band of 0 to 10 kHz, and a band of 10 to 20 kHz. The band of 0 to 10 kHz is split by a similar band-splitting filter 13, such as QMF filter, into a band of 0 to 5 kHz and a band of 5 to 10 kHz. The signals in the band of from 10 kHz to 20 kHz from band-splitting filter 12 are transmitted to the modified DCT (MDCT) circuit 14 of the illustrated embodiment for MDCT processing operations. Similarly, the signals in the band of 5 to 10 kHz and in the band of 0 to 5 kHz, supplied from the band-splitting filter 13, are transmitted to MDCT circuits 15, 16, respectively, for MDCT processing operations.

The spectral data on the frequency domain or coefficient data, generated by MDCT processing operations by the MDCT circuits 14 to 16, are grouped for each of the critical bands so as to be supplied to an adaptive bit allocation and encoding circuit 17.

Meanwhile, the critical band means a frequency band splitting system which takes human acoustic sense into consideration. That is, the critical band is a band of a narrow bandwidth noise which masks a pure tone having a frequency in the vicinity of that of the noise. The critical band becomes broader in bandwidth towards a higher frequency. The entire audible frequency range of from 0 to 20 kHz is split into for example, 25 critical bands.

The adaptive bit allocation and encoding circuit 17 normalizes each of the spectral signals by a scale factor, that is a maximum value of the absolute values of the spectral signals contained in each critical band, from one critical band to another. The circuit 17 then re-quantizes the normalized spectral signals with a sufficient number of bits to mask the quantization noise by the critical band signals to output the requantized spectral signals along with the scale factor as found for each critical band and the number of bits employed for re-quantization. The data encoded in this manner are outputted via output terminal 18.

Figure 7:
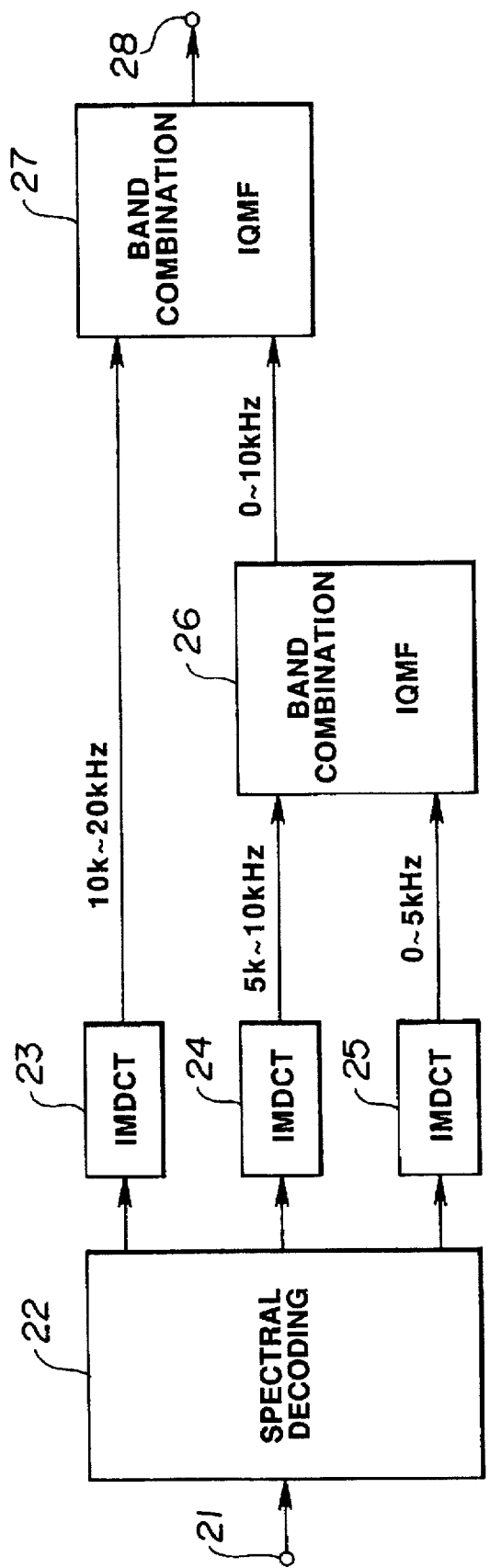
FIG. 7 is a block circuit diagram showing an example of a circuit of a high efficiency decoding device for carrying out the IMDCT signal transforming method according to the illustrated embodiment.

Referring to FIG. 7, explanation is made of a concrete example of a high efficiency decoding device, to which IMDCT as one of the above-described signal transforming operations of the illustrated embodiments is applied.

Referring to FIG. 7, the above-mentioned scale factor, the number of bits employed for requantization and requantized and encoded spectral signals are entered at input terminal 21 and spectral signals are generated by a spectral signal decoding circuit 22 from these input data. Of these spectral signals, the spectral signal in the ranges of 10 to 20 kHz, 5 to 10 kHz and 0 to 5 kHz are transformed into signal waveform data of the respective bands by IMDCT circuits 23, 24 and 25, respectively. Of these signal waveform data in the three frequency bands, the signal waveform data in the band of 0 to 5 kHz are combined with the signal waveform data in the band of 5 to 10 kHz by a band combining circuit 26 into signal waveform data in the band of 0 to 10 kHz which is then combined with the signal waveform data in the band of 10 to 20 kHz by a band combining circuit 27 into signal waveform data over the entire frequency range which is outputted at output terminal 28.

It should be noted that the present invention is not limited to the above-described embodiments. For example, the device of the present invention may be applied to a variety of transform encoding circuit or a decoder in addition to the high efficiency encoding/decoding device shown in FIGS. 6 and 7.

What is claimed is:

1. A modified discrete cosine transform signal transforming device for processing a N number of sample input signals, where N is a natural number, comprising:

a forward transforming window unit for multiplying input signals with a forward transforming window; and a linear forward transforming unit for linear forward transforming output signals of said forward transforming window unit, said linear forward transforming unit comprising a pre-processing section for pre-processing the output signals of said forward transforming window unit and an integration and summation processing section for executing integration and summation processing operations on output signals of said pre-processing section, the output signals of said pre-processing section represented solely by real number data, said integration and summation processing section executing integration and summation processing operations on a N/2 number of the output signals of said pre-processing section, said N/2 number of the output signals of said pre-processing section being previously grouped into sets, each consisting of a K number of terms, where K is a natural number, said integration and summation processing operations being iteratively executed a N/(2*K) number of times for outputting a sum total of a N/2 number of signals.

2. The modified discrete cosine transform signal transforming device of claim 1, wherein K in said integration and summation processing section has a value of not less than 4 and is equal to a power of 2.

3. The modified discrete cosine transform signal transforming device of claim 1, wherein, with the N number of samples of input signals of from 0 to (N−1) obtained by multiplying with the forward transforming window in the forward transforming window unit, the pre-processing section outputs as the nth intermediate signal an (n+3N/4)th output signal inverted in sign for n of from 0 to N/4−1, where n is a sample number, and outputs as the nth intermediate signal an (n−N/4)th output signal for n of from N/4 to N−1, and wherein, with the N number of samples of intermediate signals of from 0 to (N−1), the pre-processing section outputs an 2n-th intermediate signal less an (N−1−2n)th intermediate signal as an nth output signal.

4. The modified discrete cosine transform signal transforming device of claim 1, wherein the integration and summation processing section decreases the number of processing operations by grouping the N/2 number of the output signals of said pre-processing section into sets, each consisting of the K number of terms, based on periodicity, for outputting said sum total of the N/2 number of signals.

5. The modified discrete cosine transform signal transforming device of claim 1, wherein said integration and summation processing section performs, on the N/2 number of the output signals of said pre-processing section, a series of processing operations for an m of from 0 to N/(2K)−1, where m is an integer, until the number of output signals becomes equal to N/2, said series of the processing operations providing, as a jth first intermediate signal, a sum for I of from 0 to N/2−1 of a product of an (KI+j)th input signal multiplied by cos(π(2m+1)(4K+1)/(2N)), for j of from 0 to K⁻¹, providing, as the jth first intermediate signal, a sum for I of from 0 to N/2−1, where I is an integer, of a product of an K(I−1)+j)th input signal multiplied by sin(π(2m+1)(4KI+ 1)/(2N)), for j of from K to (2K−1), where j is a natural number, providing, as a jth second intermediate signal, a sum of the jth first intermediate signal multiplied by −cos (2π(2m+1)(j/N)) and a (j−K)th first intermediate signal multiplied by −sin(2π(2m+1)(j/N)), for j of from K to K−1, providing, as a jth second intermediate signal, a sum of the (j−K)th first intermediate signal multiplied by −sin(2π(2m+ 1)(j−K)/N)) and the jth first intermediate signal multiplied by −cos(2π(2m+1)(j−K)/N)), for j of from K to 2K−1, providing, as a k-th third intermediate signal, a sum of the jth second intermediate signal multiplied by cos(2πjk(4j+1) /(4K)), for j of from 0 to K−1 providing, as the k-th third intermediate signal, a sum of the jth second intermediate signal multiplied by sin(2πk(4(j−K)+1)/(4K)), for k of from K to (2K−1), where k is a natural number, and providing, as an (m+kN/(2K))th output signal, a sum of the k-th third intermediate signal and a (m+Kn/(2K))th third intermediate signal, for k of from 0 to K−1.

6. The modified discrete cosine transform signal transforming device of claim 5, wherein said integration and summation processing section performs a processing operation of computing an output signal of the integration and summation processing section from the jth second intermediate signal by a processing volume reduced by one half by grouping the jth second intermediate signals by each two terms by taking advantage of periodicity so that the number of the output signals of the integration and summation processing section becomes equal to N/2.

7. The modified discrete cosine transform signal transforming device of claim 5, wherein said integration and summation processing section performs a processing operation of computing an output signal of the integration and summation processing section from the jth second intermediate signal by a processing volume reduced by one quarter by grouping the jth second intermediate signals by each four terms by taking advantage of periodicity so that the number of the output signals of the integration and summation processing section becomes equal to N/2.

8. A method for discrete cosine transforming a N number of sample input signals where N is a natural number, comprising the steps of:

multiplying input signals with a forward transforming window; and linear forward transforming the multiplied input signals by pre-processing the multiplied it, put signals to generate pre-processed multiplied input signals, the pre-processed multiplied input signals represented solely by real number data, and executing integration and summation processing operations on the pre-processed multiplied input signals, wherein in the execution of integration and summation processing operations on a N/2 number of the pre-processed multiplied input signals, said N/2 number of the pre-processed multiplied input signals being previously grouped into sets each consisting of a K number of terms, where K is a natural number, said integration and summation processing operations are iteratively executed a N/(2*K) number of times for outputting a sum total of a N/2 number of signals.

9. The method of claim 8, wherein K in said integration and summation processing operations has a value of not less than 4 and is equal to a power of 2.

10. The method of claim 8, wherein, with the N number of samples of input signals of from 0 to (N−1) obtained by multiplying with the forward transforming window, the pre-processing outputs as the nth intermediate signal, a (n+3N/4)th pre-processed multiplied input signal inverted in sign for n of from 0 to N/4−1, where n is a sample number, and outputs as the nth intermediate signal a (n−N/4)th pre-processed multiplied input signal for n of from N/4 to N−1, and wherein, with the N number of samples of intermediate signals of from 0 to (N−1), the pre-processing outputs an 2n-th intermediate signal less an (N−1−2n)th intermediate signal as an nth output signal.

11. The method of claim 8, wherein the integration and summation processing decreases the number of processing operations by grouping the N/2 number of pre-processed multiplied input signals supplied into sets each consisting of the K number of terms, based on periodicity, for outputting said sum total of N/2 number of signals.

12. The method of claim 8, wherein said integration and summation processing performs, on the N/2 number of pre-processed multiplied input signals, a series of processing operations for a m of from 0 to N/(2K)−1, where m is an integer, until the number of output signals becomes equal to N/2, said series of the processing operations providing, as a jth first intermediate signal, a sum for 1 of from 0 to N/2−1 of a product of a (Kl+j)th input signal multiplied by cos(π (2m+1)(4K+1)/(2N)), for j of from 0 to K−1, providing, as the jth first intermediate signal, a sum for 1 of from 0 to N/2−1, where 1 is an integer, of a product of a (K(1−1)+j)th input signal multiplied by sin(π(2m+1)(4K1+1)/(2N)), for j of from K to (2K−1), where j is a natural number, providing, as a jth second intermediate signal, a sum of the jth first intermediate signal multiplied by $-\cos(2\pi(2m+1)(j/N))$ and a (j−K)th first intermediate signal multiplied by $-\sin(2\pi(2m+1)(j/N))$, for j of from K to K−1, providing, as a jth second intermediate signal, a sum of the (j−K)th first intermediate signal multiplied by $-\sin(2\pi(2m+1)(j-K)/N))$ and the jth first intermediate signal multiplied by $-\cos(2\pi(2m+1)(j-K)/N))$, for j of from K to 2K−1, providing, as a k-th third intermediate signal, a sum of the jth second intermediate signal multiplied by $\cos(2\pi jk(4j+1)/(4K))$, for j of from 0 to K−1 providing, as the k-th third intermediate signal, a sum of the jth second intermediate signal multiplied by $\sin(2\pi k(4(j-K)+1)/(4K))$, for k of from K to (2K−1), where k is a natural number, and providing, as a (m+kN/(2K))th output signal, a sum of the k-th third intermediate signal and a (m+Kn/(2K))th third intermediate signal, for k of from 0 to K−1.

13. The method of claim 12, wherein said integration and summation processing performs a processing operation of computing an output signal of the integration and summation processing from the jth second intermediate signal by a processing volume reduced by one half by grouping the jth second intermediate signals by each two terms by taking advantage of periodicity so that the number of output signals of the integration and summation processing becomes equal to N/2.

14. The method of claim 12, wherein said integration and summation processing performs a processing operation of computing an output signal of the integration and summation processing from the jth second intermediate signal by a processing volume reduced by one quarter by grouping the jth second intermediate signals by each four terms by taking advantage of periodicity so that the number of output signals of the integration and summation processing becomes equal to N/2.

* * * * *

UNITED STATES PATENT AND TRADEMARK OFFICE
CERTIFICATE OF CORRECTION

PATENT NO. : 5,640,421
DATED : June 17, 1997
INVENTOR(S) : MITO SONOHARA ET AL.

It is certified that error appears in the above-indentified patent and that said Letters Patent is hereby corrected as shown below:

Col. 19, line 42, "K(I-1)+j)th" should be --(K(I-1)+j)th--.

Col. 20, line 20, "it, put" should be --input--.

Signed and Sealed this

Ninth Day of September, 1997

Attest:

BRUCE LEHMAN

Attesting Officer      Commissioner of Patents and Trademarks